March 10, 1970     E. SCHICKEDANZ     3,499,813
METHOD OF MAKING SURGICAL PADS
Original Filed Nov. 17, 1964
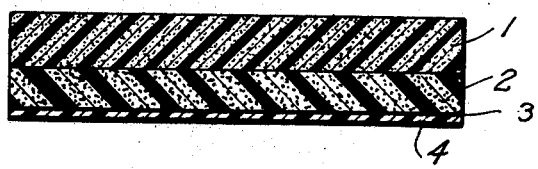
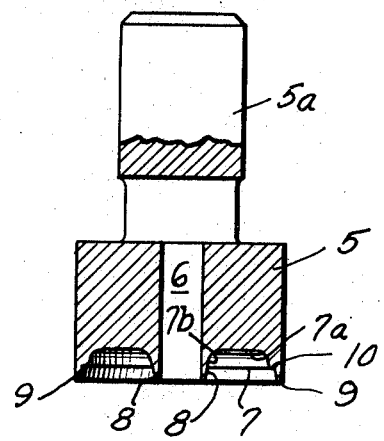
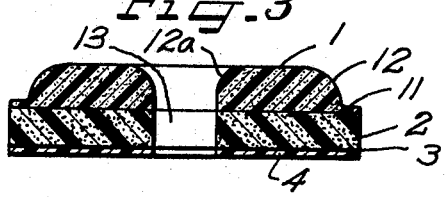
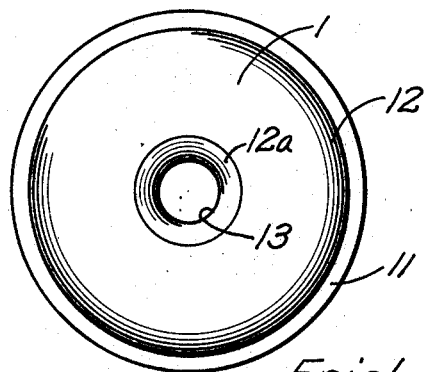
INVENTOR.
Erich Schickedanz
BY *[signature]*     ATTORNEYS

3,499,813
METHOD OF MAKING SURGICAL PADS
Erich Schickedanz, Illereichen-Altenstadt, Germany, assignor to Firma Scholl-Werke, G.m.b.H., Bergen-Enkheim, Frankfurt, Germany
Original application Nov. 17, 1964, Ser. No. 411,811, now Patent No. 3,301,254, dated Jan. 31, 1967. Divided and this application May 9, 1966, Ser. No. 548,714
Int. Cl. B32b *31/06, 31/10*
U.S. Cl. 156—220      3 Claims

ABSTRACT OF THE DISCLOSURE

A method of making a surgical pad from laminated material including an upper layer of material which may be permanently compacted while cold by pressure alone, and a lower layer of material having restorative power to assume its original size upon removal of pressure, including the simultaneous cutting through the layers and compacting the upper layer to a desired shape.

---

This application is a division of my copending application entitled "Surgical Pad, Apparatus for and Method of Making the Same," filed Nov. 17, 1964, Ser. No. 411,811, now Patent. No. 3,301,254.

This invention or discovery related to improvements in apparatus for and a method of making surgical pads, and more particularly to the making of surgical pads of the type that are adhesively attached to the body of a user for the relief of corns, calluses, bunions, and other injuries and afflictions, although the invention may have other uses and purposes as will be apparent to one skilled in the art.

Heretofore, surgical pads such as corns, callous, bunion pads and the like have often been made by punching the pad, with the aid of a punch die of suitable shape, out of a sheet or slab of felt, thermosetting or thermoplastic foam material, sponge rubber, and other satisfactory cushioning material. While a simple form of die was used for this purpose, the resultant pad had a sharp upper bounding edge with a straight side wall leading downwardly therefrom. Consequently such pads were subject to the disadvantage that when placed on the body they were likely to become dislodged due to the pulling up of the hosiery thereover which would snag on the edge of the pad, and therefore the pad would be misplaced before it had been properly put to use. Endeavors have been made to overcome that disadvantage by means of which the sharp upper edge of a pad or ring could be beveled by using a suitable cutting tool in a separate working step. Such procedure required the use of material stiff enough to respond to a beveling operation, and was extremely costly, since each pad required individual machining. Other attempts were made to eliminate sharp upper edges on pads by the electronic heat sealing process, but such heat sealing prohibits the use of certain material and the essential apparatus and method is not available to many.

Accordingly, it is an object of this invention to provide apparatus capable of forming a surgical pad provided with an outer upper edge that is not square but smoothly curvate, in a simple and single punching operation.

Another subject of this invention is the provision of apparatus for forming a surgical pad having an affliction receiving opening therethrough, with the upper edge around that opening also smoothly arcuate, such being accomplished in the same operation that shapes the pad and curves the outer upper edge thereof.

A further desideratum of this invention is the provision of apparatus for forming surgical pads having curvature outer upper edges, and wherein cushioning material may be selectively utilized from a wide variety of materials.

Also an object of this invention is the provision of a simple form of punch die capable of stamping out a surgical pad from superposed stock sheets in a single operation, and providing a curved upper edge on each pad.

A further object of the invention is the provision of a new and novel method of making a surgical pad.

While some of the more salient features, characteristics and advantages of the instant invention have been above pointed out, others will become apparent from the following disclosures, taken in conjunction with the accompanying drawing, in which:

FIGURE 1 is a transverse vertical sectional view through superimposed layers of material from which surgical pads may be punched out;

FIGURE 2 is a vertical sectional view, with the upper portional shown in elevation, of a punch die capable of forming surgical pads from a material of FIGURE 1;

FIGURE 3 is a central vertical sectional view, enlarged, through a surgical pad made by the punch of FIGURE 2; and FIGURE 4 is an enlarged plan view of the surgical pad of FIGURE 3.

AS SHOWN ON THE DRAWINGS

It will be apparent to those skilled in the art that surgical pads may be made under the instant invention, round, oval, ovate or heart-shaped, and in various other configurations as may be desired, it being a simple expedient to shape the die accordingly in accordance with a predetermined pad contour.

According to this invention, it is preferable to make a surgical pad from at least two layers of material, the upper layer consisting of a material which may be permanently compacted by pressure so that it can be substantially welded with itself in the cold state, and the material used for the lower layer is a material which can be satisfactorily punched and provides a smooth punched surface, but which although it is compacted during the punching step has restorative power to assume its original size when pressure is relieved.

In FIGURE 1 I have illustrated an upper layer 1 of permanently compactible material, which layer originally is of substantially uniform thickness throughout. This material may satisfactorily be under cross-linked polyurethane foam which is cellular in character, such as a light polyurethane foam material having a bulk density below approximately 20 kilogram per cubic meter, although under-vulcanized sponge rubber or a foam plastic material impregnated with adhesive or other holding compound might also be used, if so desired. These materials are mentioned by way of example, and not by way of limitation.

Beneath the layer 1 is a base layer 2 of material that is compressible but which will restore itself when pressure is relieved to its original thickness. The material for this layer may satisfactorily be fully cross-linked polyurethane foam plastic material, the bulk density of which is desirably over 20 kilogram per cubic meter and which is also cellular, or, if so desired, fully vulcanized cellular or sponge rubber, felt, or other suitable materials may be used. These two layers may be combined to form a laminated stock blank or sheet by adhesion, vulcanization in some cases, or any similar satisfactory bonding operation.

The lower layer 2 is preferably provided on its underface with a spread 3 of pressure sensitive adhesive protected by a facing strip 4 having a release surface thereon until time for usage, whereupon the facing sheet 4 is removed and discarded.

To form pads from the laminated structure of FIGURE 1 which may be of indefinite size, a die such as shown in FIGURE 2 is utilized. Such a die may be mounted in any suitable form of known punch press, and may be reciprocated to successively punch surgical pads out of the laminated structure, a single punching operation being all that is needed for the full forming of one surgical pad.

The punch die is provided with a head 5 mounted upon any suitable form of shank 5a, the head having a central aperture 6 therethrough in the event there is to be an affliction receiving opening in the resultant pad. The underface of the die is milled out or otherwise formed to provide an indentation or annular groove 7 so shaped as to define a sharp interior cutting edge 8 for providing the affliction receiving opening in the pad, and an outer sharp cutting edge 9 for cutting out the bounding edge of the pad from the laminated stock structure. As best seen in FIGURE 2, the groove 7 in the die is formed with an upwardly and inwardly arched or arcuate portion 7a on the outer side thereof, and an upwardly and outwardly arcuate portion 7b of lesser radius on the inner side to provide resultant arcuate formations on the pad. In the groove, a pressure shoulder 10 is also provided which tightly compresses a portion of the upper layer outside the arcuate formation 7a which provides a compressed margin on the resultant pad.

In the process of making a pad, it is a simple expedient to bring down the cutting and shaping die upon and through the laminated stock of FIGURE 1, the die being so controlled that it does not injure any base plate upon which the stock is laid, and the adhesive and facing sheet may already be upon the stock when the pad is cut. Each time the die descends a pad is formed and severed from waste stock.

As the die descends, both the layers 1 and 2 are compressed, and the pressure shoulder 10 tightly compresses the upper layer as well as the lower to provide an annular flattened shoulder 11 on the resultant pad seen in FIGURES 3 and 4. The arcuate formations of the groove at 7a provides an outer rounded edge of the upper layer, indicated at 12, and there is a lesser rounded upper edge 12a at the top of the affliction receiving opening 13 extending through the pad. Since the upper layer 1 is of permanently compactible material, that layer will remain in the shape seen in FIGURES 3 and 4 throughout the life of the pad. Of course, during the cutting and forming operation, the lower layer of the pad is compressed but when the die is lifted, this layer assumes its original thickness.

Thus, it will be seen that by the simple operation of a punch die, a surgical pad may be provided which has a smooth rounded upper edge, and this pad may have an under layer of substantially any desirable cushioning material, the resultant pad being highly durable, capable of remaining in position on the body for a considerable length of time regardless of the donning and removal of articles of apparel, and the pad itself and the entire operation of making it is extremely economical. Further, if so desired, a porous, air permeable coating providing an excellent surface for sliding apparel thereover may be applied to the upper layer of the pad, for example, by spraying on an extremely finely distributed solution of polyvinyl chloride in tetrahydrofuran, or an equivalent substance. This can be done before or after the pad is severed, but is preferably done before, since it is easier to spray any such material upon a layer having a smooth upper surface such as the layer 1 prior to the cutting of pads.

It will be understood that modifications and variations may be effected without departing from the scope of the novel concepts of the present invention.

I claim as my invention:

1. The method of making a surgical pad with a smooth rounded upper edge from flat laminated stock having a cushioning layer made of material capable of being deformed when subjected to compression and of being restored to its original size upon release of compression, bonded to a layer made of material which becomes permanently compacted and deformed upon being subjected to cold compression, comprising subjecting said laminated stock to simultaneous cutting and compression by means of an unheated die applied to the entire exposed surface of said last mentioned layer, said die being shaped to conform to the shape of the desired pad whereby there is formed a pad conforming in size and shape to said die.

2. The method of claim 1 in which the die is shaped to form a flat annular marginal portion on said pad below said smooth rounded upper edge.

3. The method of claim 1 in which said die has a central axially disposed opening whereby during the simultaneous cutting and compression there is formed a pad with a centrally disposed opening.

References Cited

UNITED STATES PATENTS

| | | | |
|---|---|---|---|
| 236,420 | 1/1881 | Doubleday | 30—301 |
| 848,561 | 3/1907 | Littlefield | 30—301 |
| 2,521,984 | 9/1950 | Lang | 156—220 |
| 2,878,153 | 3/1959 | Hacklander | 156—219 |
| 3,025,206 | 3/1962 | Scholl | 156—219 |
| 3,026,233 | 3/1962 | Scholl et al. | 156—251 |

DOUGLAS J. DRUMMOND, Primary Examiner

U.S. Cl. X.R.

156—251, 252